(12) United States Patent
Grosz

(10) Patent No.: US 10,901,903 B2
(45) Date of Patent: Jan. 26, 2021

(54) FLASH MEMORY PERSISTENT CACHE TECHNIQUES

(71) Applicant: Micron Technology, Inc., Boise, ID (US)

(72) Inventor: Nadav Grosz, Broomfield, CO (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 16/230,423

(22) Filed: Dec. 21, 2018

(65) Prior Publication Data

US 2020/0201772 A1 Jun. 25, 2020

(51) Int. Cl.
*G06F 12/0866* (2016.01)
*G06F 3/06* (2006.01)
*G06F 12/02* (2006.01)

(52) U.S. Cl.
CPC ........ *G06F 12/0866* (2013.01); *G06F 3/0629* (2013.01); *G06F 12/0246* (2013.01); *G06F 12/0292* (2013.01)

(58) Field of Classification Search
CPC ............... G06F 12/0866; G06F 3/0629; G06F 12/0246; G06F 12/0292
See application file for complete search history.

(56) References Cited

U.S. PATENT DOCUMENTS

| | | | | |
|---|---|---|---|---|
| 6,026,470 | A * | 2/2000 | Arimilli | G06F 12/0864 711/118 |
| 8,352,690 | B2 * | 1/2013 | Forhan | G06F 13/14 711/103 |
| 2006/0288170 | A1 * | 12/2006 | Varma | G06F 12/0888 711/122 |
| 2010/0082903 | A1 * | 4/2010 | Kurashige | G06F 12/0246 711/118 |
| 2018/0210832 | A1 * | 7/2018 | Tang | G06F 12/128 |

* cited by examiner

*Primary Examiner* — David Yi
*Assistant Examiner* — Tahilba O Puche
(74) *Attorney, Agent, or Firm* — Schwegman Lundberg & Woessner, P.A.

(57) ABSTRACT

Devices and techniques are disclosed herein for implementing, in addition to a first cache, a second, persistent cache in a memory system coupled to a host. The memory system can include flash memory. In certain examples, the first cache and the second cache are configured to store mapping information. In some examples, the mapping information of the second persistent cache is determined by the host using a persistence flag of memory requests provided to the memory system.

20 Claims, 3 Drawing Sheets

FLASH MEMORY PERSISTENT CACHE TECHNIQUES

BACKGROUND

Memory devices are typically provided as internal, semiconductor, integrated circuits in computers or other electronic devices. There are many different types of memory including volatile and non-volatile memory. Volatile memory can require power to maintain data and includes random-access memory (RAM), dynamic random-access memory (DRAM), and synchronous dynamic random-access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random-access memory (RRAM), and magnetoresistive random access memory (MRAM), 3D XPoint™ memory, among others.

Memory cells are typically arranged in a matrix or an array. Multiple matrices or arrays can be combined into a memory device, and multiple devices can be combined to form a storage volume of a memory system, such as a solid-state drive (SSD), a Universal Flash Storage (UFS™) device, a MultiMediaCard (MMC) solid-state storage device, an embedded MMC device (eMMC™), etc.

A memory system can include one or more processors or other memory controllers performing logic functions to operate the memory devices or interface with external systems. The memory matrices or arrays can include a number of blocks of memory cells organized into a number of physical pages. The memory system can receive commands from a host in association with memory operations, such as read or write operations to transfer data (e.g., user data and associated integrity data, such as error data and address data, etc.) between the memory devices and the host, erase operations to erase data from the memory devices, or perform one or more other memory operations.

Memory is utilized as volatile and non-volatile data storage for a wide range of electronic applications, including, for example, personal computers, portable memory sticks, digital cameras, cellular telephones, portable music players such as MP3 players, movie players, and other electronic devices. Memory cells can be arranged into arrays, with the arrays being used in memory devices.

Many electronic devices include several main components: a host processor (e.g., a central processing unit (CPU) or other main processor); main memory (e.g., one or more volatile or non-volatile memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, or combination of volatile and non-volatile memory, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Flash memory based storage devices such as NAND memory can use a Flash Translation Layer (FTL) to translate logical addresses of I/O requests, often referred to as logical block addresses (LBAs), to corresponding flash memory addresses which are stored in one or more FTL mapping tables. LBAs can be the logical addresses used by a host for managing data. Mobile storage devices typically have a cache but often lack memory to store an entire mapping table. Therefore, portions of the mapping table(s) can be retrieved from the flash memory on demand. However, flash memory is generally much slower than options suitable for cache memory, therefore, retrieving portions of a mapping table can cause random read performance degradation.

Figure 1:
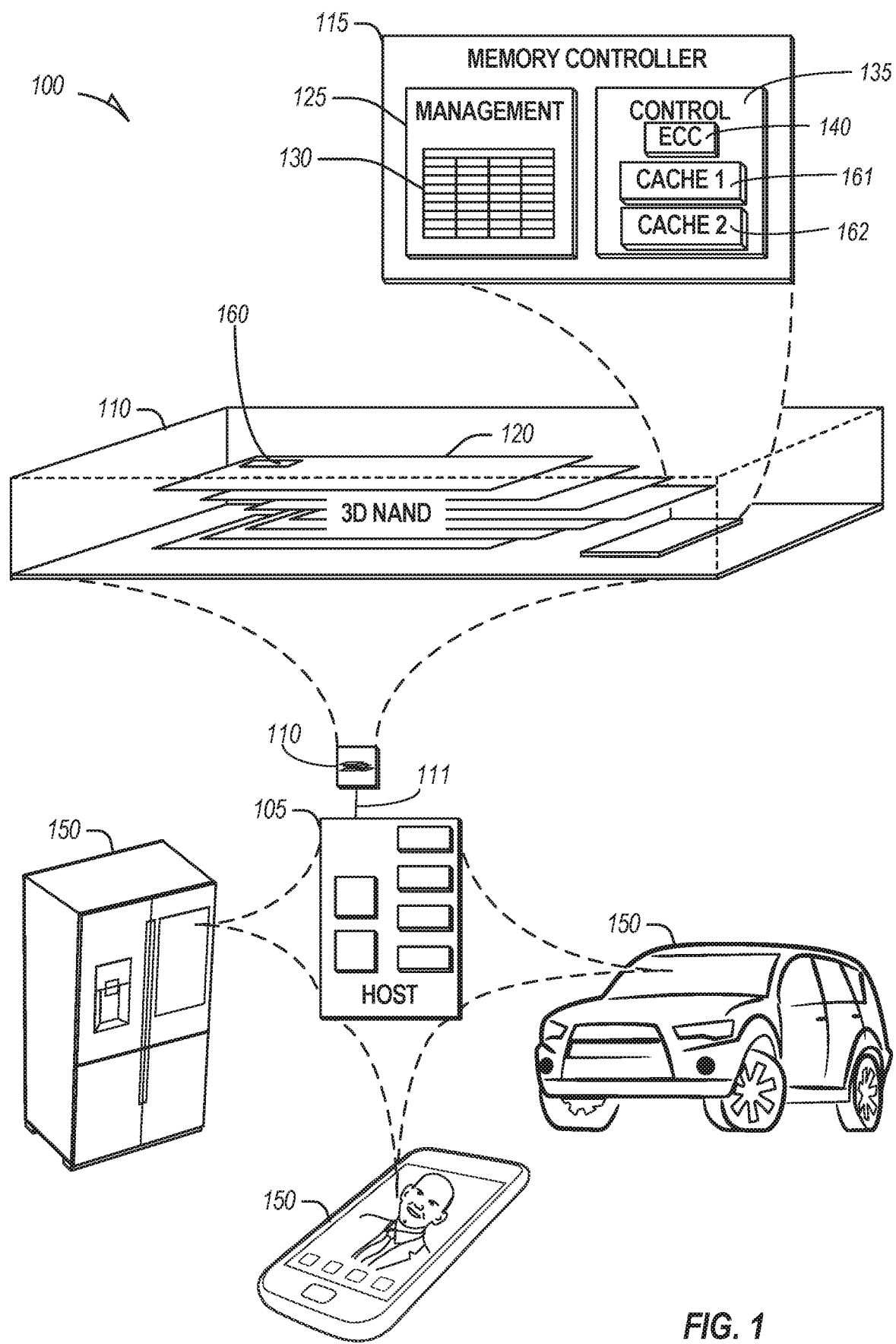
FIG. 1 illustrates an example system an environment including a memory device upon which one or more examples of the present subject matter may be implemented.

FIG. 1 illustrates an example of an environment 100 including a host 105 and a memory device 110 configured to communicate over a communication interface. The host 105 or the memory device 110 may be included in a variety of products 150, such as IoT devices (e.g., a refrigerator or other appliance, sensor, motor or actuator, mobile communication device, automobile, mobile phone, drone, etc.) to support processing, communications, or control of the product 150.

The memory device 110 includes a memory controller 115 and a memory array 120 including, for example, one or more individual memory die (e.g., a stack of three-dimensional (3D) NAND die). In 3D architecture semiconductor memory technology, vertical structures are stacked in multiple tiers, and coupled to form physical pages, to increase the storage density of a memory device (e.g., a storage device) in a given footprint (i.e. form factor). In an example, the memory device 110 can be a discrete memory device. In certain examples, one or more memory arrays 120 can include a complete copy of the entire FTL mapping table 160.

One or more communication interfaces 111 can be used to transfer data between the memory device 110 and one or more other components of the host 105, such as a Serial Advanced Technology Attachment (SATA) interface, a Peripheral Component Interconnect Express (PCIe) interface, a Universal Serial Bus (USB) interface, a UFS interface, an eMMC™ interface, or one or more other connectors or interfaces. The host 105 can include a host system, an electronic device, a processor, a memory card reader, or one or more other electronic devices external to the memory device 110. In some examples, the host 105 may be a machine having some portion, or all, of the components discussed in reference to the machine 400 of FIG. 4. Data may be transferred between the memory device 110 and other components over an input/output (I/O) bus that may include one or more latches for temporarily storing the data as it is being transferred (e.g., before being read or written from/to a memory array).

The memory controller 115 can receive instructions from the host 105, and can communicate with the memory array, such as to transfer data to (e.g., write or erase) or from (e.g., read) one or more of the memory cells, planes, sub-blocks, blocks, or pages of the memory array. The memory controller 115 can include, among other things, circuitry or firmware, including one or more components or integrated circuits. For example, the memory controller 115 can include one or more memory control units, circuits, control circuitries, or components configured to control access across the memory array 120 and to provide a translation layer between the host 105 and the memory device 110. The memory controller 115 can include one or more I/O circuits (and corresponding latches), caches, lines, or interfaces to transfer data to or from the memory array 120. The memory controller 115 can include a memory manager 125 and an array controller 135.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. ECC component 140, for example, may detect or compute a bit-error-rate (BER) associated with performing a number of memory operations. The BER may correspond to bit errors occurring in latches of an I/O bus, internal errors of memory controller 115, errors occurring in one or more of the NAND arrays, or any one or more of the multi-level cell(s) (MLC) of the memory device 110. The memory controller 115 can be configured to actively detect and recover from error occurrences (e.g., bit errors, operation errors, crash conditions, stalls, hang ups, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors. Array controller 135 may transmit detected BER information to memory manager 125 for storage and tracking. The memory controller 115 may include a command queue (not shown) that tracks memory commands received from a host. Commands in the queue may be executed by memory controller 115 in a first-in first-out (FIFO) manner, stack manner, out of sequence, according to priority, or in any other suitable order.

In certain examples, the memory device 110 can include one or more caches 161, 162 in association with the memory array 120. In certain examples, the caches 161, 162 can include first cache 161 to store a portion of the FTL table 160. In certain examples, memory requests from the host can include logical block addresses of the host memory system that, over an interval of time, can be accessed, in the memory device 110 via a host memory request, more often than other groups of logical block addresses. If the portion of the FTL table 160 stored within the first cache 161 includes a logical block address that matches corresponding information included with a memory request from the host, the data area of the flash memory of memory device can be accessed much quicker than if the FTL table 160 of the flash memory array 120 is accessed to find matching information.

In certain examples, the memory device can include a second cache, also referred to as a persistent cache 162. The persistent cache 162 can include specific FTL map information. In certain examples, the FTL map information stored in the persistent cache 162 can include mapping information that is anticipated to be accessed more often than other mapping information over a given interval of time or, for example, over the entire interval of operation of the host and memory device. In certain examples, the FTL information stored in the persistent cache 162 can map to basic operating system data of the host and can prevent intermittent reloads of the first cache 161.

For example, in a conventional memory device with a single cache, if the single cache includes first FTL information for a range of logical block addresses the host is currently working with and the host receives an interrupt that is known to occur relatively often, the conventional system accesses the flash memory to overwrite the single cache with second FTL information required to service the interrupt. Upon completion of servicing the interrupt, the conventional system accesses the flash memory to reload the single cache with the first FTL information to continue operations in-progress before the interrupt. Each access of the flash memory is relatively slow compared to using information already in the single cache.

The present inventor has recognized that a second, persistent cache 162 can eliminate some memory array accesses including and in addition to those described above. In certain examples, the host can control at least some operations of the persistent cache. In certain examples, some of the operations under exclusive control of the host can include specifying the specific flash translation information to be stored in the persistent cache and controlling the erasure or replacement of stored flash translation information of the persistent cache. In certain examples, the persistent cache can be volatile, therefore, the exclusive control operations of the host do not include retention of information within the persistent cache during power-down events of the memory device, during power-up events of the memory device, and between a power-down event and an immediately subsequent power-up event. In general, each cache 160, 161 can include a type of memory having an access time that is less than the access time of the flash memory of the memory device.

In certain examples, the access time of the persistent cache is less than 80% of the access time of the flash memory of the memory device. In certain examples, the access time of the persistent cache is less than 60% of the access time of the flash memory of the memory device. In certain examples, the access time of the persistent cache is less than 40% of the access time of the flash memory of the memory device. In certain examples, the access time of the persistent cache is less than 10% of the access time of the flash memory of the memory device. In certain examples, the access time of the persistent cache is less than 2% of the access time of the flash memory of the memory device.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection (e.g., BER monitoring) or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more components of the memory device 110 (e.g., various information associated with a memory array or one or more memory cells coupled to the memory controller 115 and can include an FTL table). For example, the management tables 130 can include information regarding block age, block erase count, error history, error parameter information, host reset timeout value, memory operation command latencies, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts (e.g., an error parameter) is above a threshold (e.g., an allowable error threshold), the bit error can be referred to as an uncorrectable bit error. The management tables 130 can maintain a count of correctable or uncorrectable bit errors, among other things.

The memory array 120 can include multiple memory cells arranged in, for example, a number of devices, planes, sub-blocks, blocks, or pages. As one example, a 48 GB TLC NAND memory device can include 18,592 bytes of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the memory device 110 in pages and erased in blocks. However, one or more memory operations (e.g., read, write, erase, etc.) can be performed on larger or smaller groups of memory cells, as desired. The data transfer size of a memory device 110 is typically referred to as a page, whereas the data transfer size of a host is typically referred to as a sector.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a MLC NAND flash device may have a higher bit error rate than a corresponding single-level cell (SLC) NAND flash device. As such, the MLC device may require more metadata bytes for error data than the corresponding SLC device. In certain examples, the memory controller or memory manager can perform internal operations to optimize performance, operation, or longevity of the flash memory. Such internal operations can include, but are not limited to, garbage collection and wear leveling, and can move data that had been previously mapped. The memory controller or the memory manager can modify FTL information of either the first cache or the persistent cache to update and keep accurate the mapping information considering the internal operations of the memory device.

Figure 2:
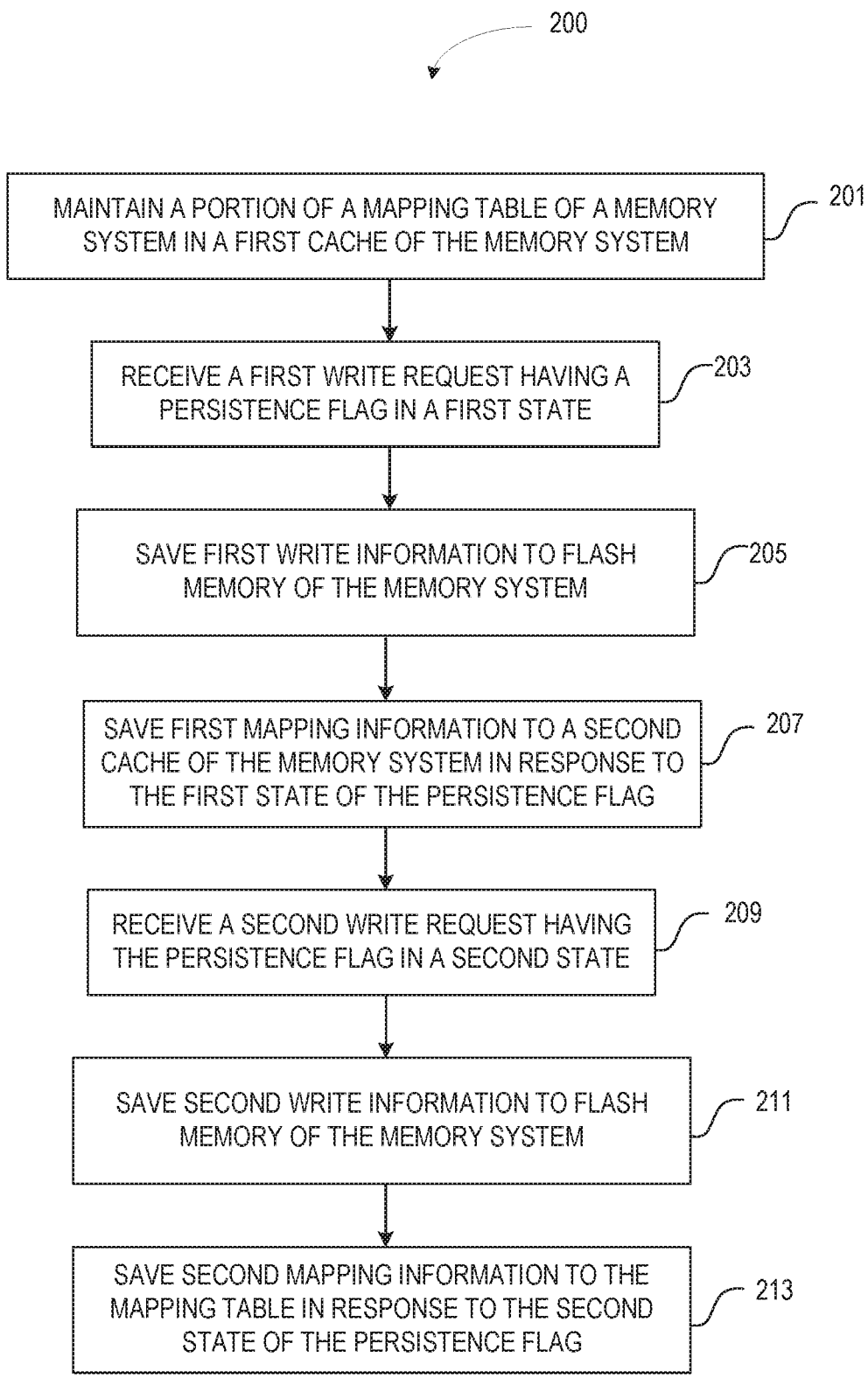
FIG. 2 illustrates generally a flowchart of an example method for implementing memory operations at a flash memory system having a persistent cache.

FIG. 2 illustrates generally a flowchart of an example method 200 for implementing memory operations at a flash memory system having a persistent cache. At 201, the method can include maintaining a first portion of a mapping table of a memory system in a first cache of the memory system. As discussed above, flash memory is generally slower than some other forms of memory, yet each memory command received from the host generally is parsed to find or assign a physical address of the memory system corresponding to a logical block address of the host, where the logical block address is typically included with the memory command. Memory devices can include fast memory, or cache memory, to facilitate translating the logical block address to the physical address for a mapping table and to store at least a portion of the mapping table such that memory requests can have a chance of being serviced faster compared to accessing the flash memory to retrieve mapping information in addition to accessing the flash memory to handle the memory request data. Only a portion of a mapping table is typically stored in the first cache because additional fast memory space would sacrifice non-volatile memory capacity of the memory device. As such, the first cache is often written over with a different portion of the mapping table when a logical block address of a memory request is not found in the current cached portion of the mapping table.

At 203, the memory device can receive a first write request from the host. The first write request can include a first logical block address of the host system, first write information, and a persistence flag in a first state. In certain examples, the first state of the persistence flag indicates that the mapping data for the first write information should be saved to a second, persistent cache. At 205, the first write information is saved to flash memory of the memory system. At 207, first mapping information is saved to the second cache of the memory system in response to the first state of the persistence flag. In certain examples, the first mapping information can include the first logical block address received with the first write commend. In certain examples, in addition to saving the first mapping information to the persistent second cache, the first mapping information can be saved to the mapping table.

At 209, a second write request from the host can be received at the memory system. The second write request can include a second logical block address of the host system, second write information, and the persistence flag of the write command in a second state. In certain examples, the second state of the persistence flag indicates that the mapping data for the first write information can be saved to the first cache or directly to the flash memory mapping table. At 211, the second write information can be saved to the flash memory of the memory system. At 213, second mapping information can be saved to the mapping table in response to the second state of the flag. In certain examples, the second mapping information can include the second logical block address.

The second, persistent cache can allow a more efficient operation of the overall system that includes the host and the memory system. The second cache can be used by the host to store mapping information associated with data that the host will access relatively often, for clarity, such data is referred to herein as "high-use" data. If the memory system includes a single undivided cache, there is a strong probability that the portion of the mapping table in the cache when the host accesses the "high-use" data will not include mapping information for the "high-use" data. When the portion of the mapping table in the cache does not include mapping information associated with a host memory request, the memory system can access the slower flash memory to retrieve the portion of the mapping table corresponding to the host memory request. Such flash memory accesses have a significant cost in terms of time. Having a second cache according to the present subject matter can eliminate some accesses to the flash memory, such as when mapping information for "high-use" data is stored in a second, persistent cache of the memory system.

In certain examples, a difference between the first cache of the memory system and the second cache of the memory system is the configured control of when mapping information in each cache is erased or overwritten. Regarding the first cache, the memory system, or a memory controller or memory manager of the memory system, can initiate erasing and overwriting the mapping information of the first cache. Regarding the second, persistent cache, the memory system, or a memory controller or memory manager of the memory system, erases or overwrites mapping information in response to a command from the host. In certain examples, a memory controller or memory manager of the memory system, can update mapping information of the persistent cache to accommodate internal operations such as garbage collection and wear leveling.

In certain examples, the host can configure the size of the persistent cache. In support of such operations, the memory system can receive and respond to inquiries from the host. Such inquiries can include total cache size of both the first cache and the persistent cache, total size of the persistent cache, the size of unused space available in the persistent cache. In certain examples, such as a Universal Flash Storage (UFS) compliant memory system or device, a memory request can include among other things, a command field that a host can set to a value for a particular memory request, and a group field. In certain examples, the group field can include the persistence flag.

In certain examples, the memory device can transfer contents of the second, persistent cache to non-volatile memory prior to a power cycle of the system or the memory device. Upon power-up of the system or the memory device, the content of the persistent cache can be repopulated from the non-volatile memory. In certain examples, such a feature can allow the mapping table of the "high-use" data to survive power cycles and allow for faster wake-up of the system, especially when the "high-use" data is associated with an operating system of the host, for example.

Figure 3:
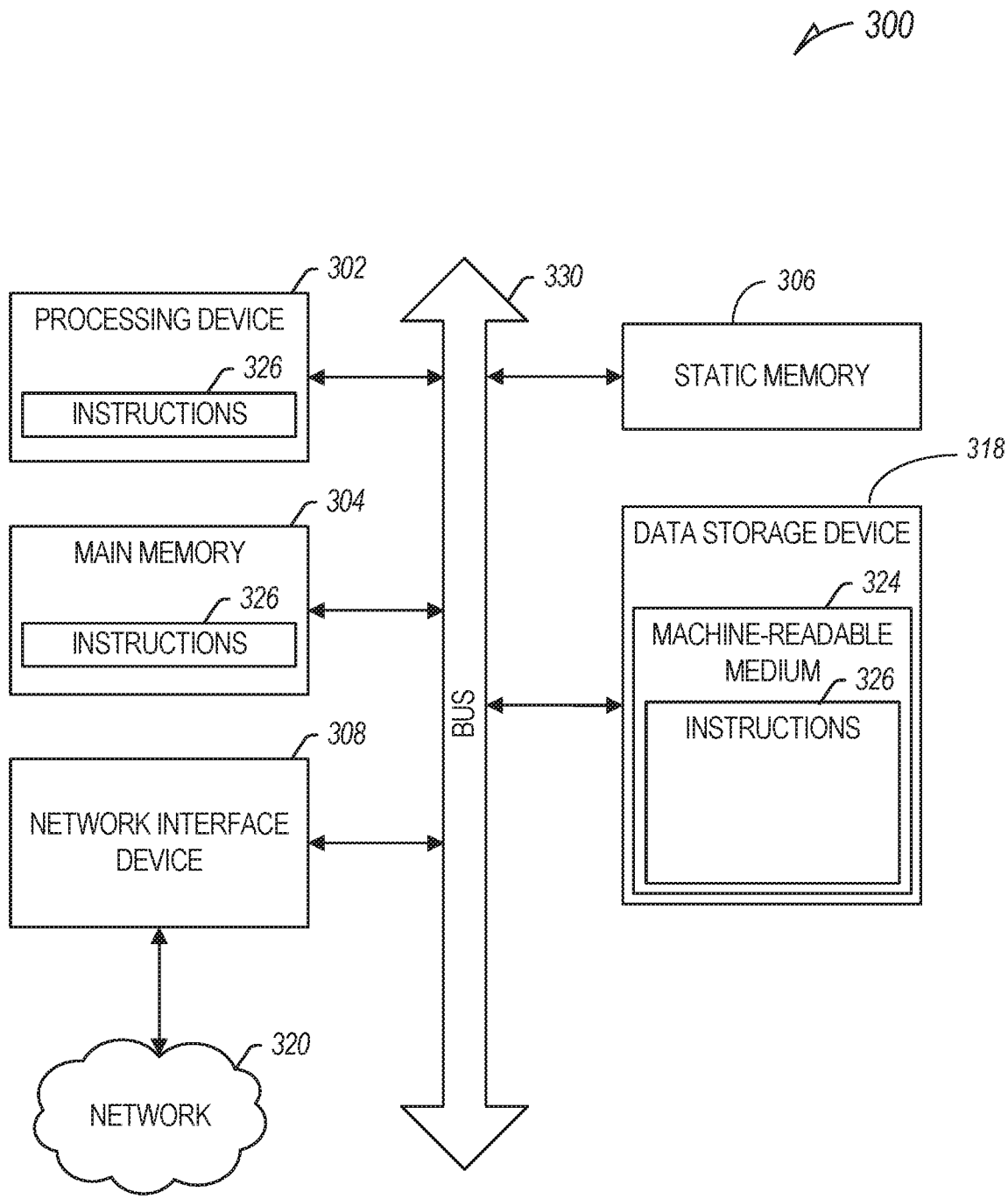
FIG. 3 illustrates a block diagram of an example machine upon which any one or more of the techniques (e.g., methodologies) discussed herein may perform.

FIG. 3 illustrates a block diagram of an example machine 300 upon which any one or more of the techniques (e.g., methodologies) discussed herein may perform. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 300 (e.g., the host 105, the memory device 110, etc.) may include a processing device 302 (e.g., a hardware processor, a central processing unit (CPU), a graphics processing unit (GPU), a hardware processor core, or any combination thereof, such as a memory controller of the memory device 110, etc.), a main memory 304 (e.g., read-only memory (ROM), flash memory, dynamic random-access memory (DRAM) such as synchronous DRAM (SDRAM) or Rambus DRAM (RDRAM), etc.), a static memory 306 (e.g., flash memory, static random-access memory (SRAM), etc.), and a data storage system 318, some or all of which may communicate with each other via an interlink (e.g., bus) 330.

The processing device 302 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 302 can also be one or more special-purpose processing devices such as an application specific integrated circuit (ASIC), a field programmable gate array (FPGA), a digital signal processor (DSP), network processor, or the like. The processing device 302 can be configured to execute instructions 326 for performing the operations and steps discussed herein. The computer system 300 can further include a network interface device 308 to communicate over a network 320.

The data storage system 318 can include a machine-readable storage medium 324 (also known as a computer-readable medium) on which is stored one or more sets of instructions 326 or software embodying any one or more of the methodologies or functions described herein. The instructions 326 can also reside, completely or at least partially, within the main memory 304 or within the processing device 302 during execution thereof by the computer system 300, the main memory 304 and the processing device 302 also constituting machine-readable storage media. The machine-readable storage medium 324, the data storage system 318, or the main memory 304 can correspond to the memory device 110 of FIG. 1.

In one implementation, the instructions 326 include instructions to implement functionality corresponding to implementing a second persistent cache as discussed above with respect to FIG. 2 or FIG. 3. While the machine-readable storage medium 324 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EPROM)) and flash memory devices; magnetic disks, such as internal hard disks and removable disks; magneto-optical disks; and CD-ROM and DVD-ROM disks.

The machine 300 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 300 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 326 (e.g., software, programs, an operating system (OS), etc.) or other data are stored on the data storage device 318 can be accessed by the main memory 304 for use by the processing device 302. The main memory 304 (e.g., DRAM) is typically fast, but volatile, and thus a different type of storage than the data storage device 318 (e.g., an SSD), which is suitable for long-term storage, including while in an "off" condition. The instructions 326 or data in use by a user or the machine 300 are typically loaded in the main memory 304 for use by the processing device 302. When the main memory 304 is full, virtual space from the data storage device 318 can be allocated to supplement the main memory 304; however, because the data storage device 318 device is typically slower than the main memory 304, and write speeds are typically at least twice as slow as read speeds, use of virtual memory can greatly reduce user experience due to storage device latency (in contrast to the main memory 304, e.g., DRAM). Further, use of the data storage device 318 for virtual memory can greatly reduce the usable lifespan of the data storage device 318.

In contrast to virtual memory, virtual memory compression (e.g., the Linux™ kernel feature "ZRAM") uses part of the memory as compressed block storage to avoid paging to the data storage device 318. Paging takes place in the compressed block until it is necessary to write such data to the data storage device 318. Virtual memory compression increases the usable size of the main memory 304, while reducing wear on the data storage device 318.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host (e.g., a host device), and are often removable and separate components from the host. In contrast, eMMC™ devices are attached to a circuit board and considered a component of the host, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host using a low-voltage differential signaling (LVDS) serial interface with dedicated read/write paths, further advancing greater read/write speeds.

The instructions 324 may further be transmitted or received over a network 320 using a transmission medium via the network interface device 308 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 308 may include one or more physical jacks (e.g., Ethernet, coaxial, or phone jacks) or one or more antennas to connect to the network 320. In an example, the network interface device 308 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 300, and includes digital or analog communications signals or other intangible medium to facilitate communication of such software.

ADDITIONAL NOTES AND EXAMPLES

Example 1 is a method comprising: maintaining a first portion of a mapping table of a memory system in a first cache of the memory system; receiving a first write request from a host at the memory system, the first write request including a first logical block address of the host, first write information, and a persistent flag in a first state; saving the first write information to flash memory of the memory system; saving first mapping information to a second persistent cache of the memory system in response to the first state of the persistence flag, the first mapping information including the first logical block address, wherein the second persistent cache is a persistent cache; receiving a second write request from the host, the second write request including a second logical block address of the host, second write information, and a persistence flag in a second state; saving the second write information to the flash memory of the memory system; and saving second mapping information to the first cache of the memory system in response to the second state of the persistent flag, the second mapping information including the second logical block address.

In Example 2, the subject matter of Example 1 includes, wherein the memory system does not overwrite the first logical block address in the second cache without receiving a specific command from the host to overwrite the first logical block address within the second cache.

In Example 3, the subject matter of Examples 1-2 includes, maintaining the mapping table in flash memory of the memory system; and updating the mapping table in the flash memory with the first mapping information.

In Example 4, the subject matter of Examples 1-3 includes, receiving a first inquiry from the host at the memory system; and providing an indication of a size of persistent in response to the first inquiry.

In Example 5, the subject matter of Examples 1-4 includes, receiving a first inquiry from the host at the memory system; and providing an indication of a size of unused space of the second persistent cache in response to the first inquiry.

In Example 6, the subject matter of Examples 1-5 includes, receiving a second command from the host at the memory system, the second command including a cache size; and allocating a size of the second persistent cache commensurate with the cache size in response to the second command.

In Example 7, the subject matter of Examples 1-6 includes, receiving a second command from the host as the memory system; and erasing at least a portion of the second persistent cache in response to the second command, wherein the at least a portion includes the first logical block address.

In Example 8, the subject matter of Examples 1-7 includes, wherein a group number of the first write request includes the persistence flag.

In Example 9, the subject matter of Examples 1-8 includes, receiving a read request from the host at the memory system, wherein the read request includes a third logical block address; and determining a persistence flag of the read request is in the first state.

In Example 10, the subject matter of Example 9 includes, matching the third logical block address with one logical block address of a plurality of logical block addresses of the second persistent cache; identifying a first physical address stored with the one logical block address in the second cache; reading read information from the flash memory of the memory system using the first physical address; and providing the read information to the host in response to the read request.

In Example 11, the subject matter of Examples 9-10 includes, not matching the third logical block address with one logical block address of a plurality of logical block addresses of the second persistent cache; and providing error information to the host in response to the read request, wherein the error information indicates failure to match a logical block address of the second cache with the third logical block address.

In Example 12, the subject matter of Examples 9-11 includes, receiving a second read request from the host at the memory system, wherein the second read request includes a fourth logical block address; and determining a persistence flag of the second read request is in the second state.

In Example 13, the subject matter of Example 12 includes, matching the fourth logical block address with one logical block address of a plurality of logical block addresses of the first cache; identifying first physical address stored with the one logical block address in the first cache; reading second read information from the flash memory of the memory system using the first physical address of the first cache; and providing the second read information to the host in response to the second read request.

In Example 14, the subject matter of Example 13 includes, wherein the third logical block address is the same as the first logical block address.

In Example 15, the subject matter of Examples 13-14 includes, wherein the fourth logical block address is the same as the second logical block address.

In Example 16, the subject matter of Examples 12-15 includes, failing to match the fourth logical block address with one logical block address of a plurality of logical block addresses of the first cache; overwriting the first portion of the mapping table in the first cache with a second portion of the mapping table retrieved from the flash memory of the memory system; matching the fourth logical block address with one logical block address of a plurality of logical block addresses of the second portion of the mapping table within the first cache; identifying a first physical address stored with the one logical block address in the first cache; reading second read information from the flash memory of the memory system using the first physical address of the first cache; and providing the second read information to the host in response to the second read request.

Example 17 is a memory device comprising: a first cache configured to hold a portion of a mapping table of the memory device; a second cache configured to hold persistent mapping information of the memory device, wherein the persistent mapping information is indicated via a persistence flag of a write request received from a host; flash memory configured to store and retrieve user data of a host, and to store the mapping table of the memory device; and a controller configured to: maintaining a first portion of a mapping table of a memory system in a first cache of the memory system; receive a first write request from the host, the first write request including a first logical block address of the host, a size of first write information, and the persistence flag in a first state; save the first write information to flash memory of the memory system; save first mapping information to the second cache of the memory system in response to the first state of the persistence flag, the first mapping information including the first logical block address; receive a second write request from the host, the second write request including a second logical block address of the host, a size of second write information, and the persistence flag in a second state; saving the second write information to the flash memory of the memory system; and saving second mapping information to the first cache of the memory system in response to the second state of the persistence flag, the second mapping information including the second logical block address.

In Example 18, the subject matter of Example 17 includes, wherein the controller is not configured overwrite the first logical block address in the second cache without receiving a specific command from the host to overwrite the first logical block address within the second cache.

In Example 19, the subject matter of Examples 17-18 includes, wherein the controller is configured to maintain the mapping table in flash memory of the memory system, and to update the memory table in the flash memory with the first mapping information.

In Example 20, the subject matter of Examples 17-19 includes, wherein the controller is configured to receive a first inquiry from the host, and to provide an indication of a size of the second cache in response to the first inquiry. The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended. A system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. Unless otherwise clearly indicated by express language or context, MLC is used herein in its broader context, to refer to memory cells that can store more than one bit of data per cell (i.e., that can represent more than two programmed states).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine, device, or computer-implemented at least in part. Some examples can include a computer-readable medium, a device-readable medium, or a machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method comprising:
    maintaining a first portion of a mapping table of a memory system in a first cache of the memory system;
    receiving a first write request from a host at the memory system, the first write request including a first logical block address of the host, first write information, and a persistent flag in a first state;
    saving the first write information to flash memory of the memory system;
    saving first mapping information to a second cache of the memory system in response to the first state of the persistence flag, the first mapping information including the first logical block address, wherein the second cache is a persistent cache;
    receiving a second write request from the host, the second write request including a second logical block address of the host, second write information, and a persistence flag in a second state;
    saving the second write information to the flash memory of the memory system; and
    saving second mapping information to the first cache of the memory system in response to the second state of the persistent flag, the second mapping information including the second logical block address.

2. The method of claim 1, wherein the memory system does not overwrite the first logical block address in the second cache without receiving a specific command from the host to overwrite the first logical block address within the second cache.

3. The method of claim 1, including maintaining the mapping table in flash memory of the memory system; and
    updating the mapping table in the flash memory with the first mapping information.

4. The method of claim 1, including:
    receiving a first inquiry from the host at the memory system; and
    providing an indication of a size of the second cache in response to the first inquiry.

5. The method of claim 1, including:
    receiving a first inquiry from the host at the memory system; and
    providing an indication of a size of unused space of the second cache in response to the first inquiry.

6. The method of claim 1, including receiving a second command from the host at the memory system, the second command including a cache size; and
    allocating a size of the second cache commensurate with the cache size in response to the second command.

7. The method of claim 1, including receiving a second command from the host at the memory system; and
    erasing at least a portion of the second cache in response to the second command, wherein the at least a portion includes the first logical block address.

8. The method of claim 1, wherein a group number of the first write request includes the persistence flag.

9. The method of claim 1, including:
    receiving a read request from the host at the memory system, wherein the read request includes a third logical block address; and
    determining a persistence flag of the read request is in the first state.

10. The method of claim 9, including matching the third logical block address with one logical block address of a plurality of logical block addresses of the second cache;
    identifying a first physical address stored with the one logical block address in the second cache;
    reading read information from the flash memory of the memory system using the first physical address; and
    providing the read information to the host in response to the read request.

11. The method of claim 9, including not matching the third logical block address with one logical block address of a plurality of logical block addresses of the second cache; and
    providing error information to the host in response to the read request, wherein the error information indicates failure to match a logical block address of the second cache with the third logical block address.

12. The method of claim 9, including receiving a second read request from the host at the memory system, wherein the second read request includes a fourth logical block address; and
    determining a persistence flag of the second read request is in the second state.

13. The method of claim 12, including:
    matching the fourth logical block address with one logical block address of a plurality of logical block addresses of the first cache;
    identifying first physical address stored with the one logical block address in the first cache;
    reading second read information from the flash memory of the memory system using the first physical address of the first cache; and
    providing the second read information to the host in response to the second read request.

14. The method of claim 13, wherein the third logical block address is the same as the first logical block address.

15. The method of claim 13, wherein the fourth logical block address is the same as the second logical block address.

16. The method of claim 12, including:
failing to match the fourth logical block address with one logical block address of a plurality of logical block addresses of the first cache;
overwriting the first portion of the mapping table in the first cache with a second portion of the mapping table retrieved from the flash memory of the memory system;
matching the fourth logical block address with one logical block address of a plurality of logical block addresses of the second portion of the mapping table within the first cache;
identifying a first physical address stored with the one logical block address in the first cache;
reading second read information from the flash memory of the memory system using the first physical address of the first cache; and
providing the second read information to the host in response to the second read request.

17. A memory device comprising:
a first cache configured to hold a portion of a mapping table of the memory device;
a second cache configured to hold persistent mapping information of the memory device, wherein the persistent mapping information is indicated via a persistence flag of a write request received from a host;
flash memory configured to store and retrieve user data of a host, and to store the mapping table of the memory device; and
a controller configured to:
maintain a first portion of the mapping table of the memory device in the first cache;
receive a first write request from the host, the first write request including a first logical block address of the host, a size of first write information, and the persistence flag in a first state;
save the first write information to flash memory of the memory device;
save first mapping information to the second cache in response to the first state of the persistence flag, the first mapping information including the first logical block address;
receive a second write request from the host, the second write request including a second logical block address of the host, a size of second write information, and the persistence flag in a second state;
save the second write information to the flash memory of the memory device; and
save second mapping information to the first cache in response to the second state of the persistence flag, the second mapping information including the second logical block address.

18. The memory device of claim 17, wherein the controller is not configured overwrite the first logical block address in the second cache without receiving a specific command from the host to overwrite the first logical block address within the second cache.

19. The memory device of claim 17, wherein the controller is configured to maintain the mapping table in flash memory of the memory device, and to update the memory table in the flash memory with the first mapping information.

20. The memory device of claim 17, wherein the controller is configured to receive a first inquiry from the host, and to provide an indication of a size of the second cache in response to the first inquiry.

* * * * *